(12) United States Patent
Inoue et al.

(10) Patent No.: US 7,074,160 B1
(45) Date of Patent: Jul. 11, 2006

(54) CONTROLLER FOR DRIVING SYSTEM OF VEHICLE

(75) Inventors: Daisuke Inoue, Toyota (JP); Hideki Yasue, Toyota (JP); Tadashi Tamura, Aichi-ken (JP); Hiroki Kondo, Toyota (JP); Yuji Hattori, Bisai (JP); Tetsuo Hamajima, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 10/111,379

(22) PCT Filed: Oct. 18, 2000

(86) PCT No.: PCT/JP00/07207

§ 371 (c)(1),
(2), (4) Date: Apr. 24, 2002

(87) PCT Pub. No.: WO01/32461

PCT Pub. Date: May 10, 2001

(30) Foreign Application Priority Data

Oct. 29, 1999 (JP) .................................. 11-308385

(51) Int. Cl.
*B60K 41/20* (2006.01)
(52) U.S. Cl. .......................... 477/180; 477/39; 477/73; 477/74; 477/77; 477/80
(58) Field of Classification Search .................. 477/39, 477/40, 71, 73, 74, 77, 80, 86, 90, 109, 110, 477/171, 173, 175, 180; 701/74, 75
See application file for complete search history.

(56) References Cited

U.S. PATENT DOCUMENTS 4,478,322 A 10/1984 Carlson et al.

(Continued)

FOREIGN PATENT DOCUMENTS

JP 57-65455 4/1982

(Continued)

OTHER PUBLICATIONS

Microfilm of the specification and drawings annexed to the request of Japanese Utility Model Application No. 69439/1991 (Laid-Open No. 21142/1993) Japan Electronic Control System Co., Ltd.), Mar. 19, 1993, Figs. 8, 12, 14; description, Par. Nos. [0025] to [0027], [0043] to [0048] (Family: none).

Microfilm of the specification and drawings annexed to the request of Japanese Utility Model Application No. 114238/1990 (Laid-Open No. 74767/1992) (Fuji Heavy Industries Ltd.), Jun. 30, 1992, description pp. 1 to 3, 12 (Family: none).

*Primary Examiner*—Ha Ho
(74) *Attorney, Agent, or Firm*—Oblon, Spivak, McClelland, Maier & Neustadt, P.C.

(57) ABSTRACT

A control device for a drive line of a vehicle, in which a drive line from a power source to drive wheel includes a wheel control for controlling the speed of the wheels, and a connection mechanism for increasing/decreasing a torque transmission capacity between the power source and the drive wheels. The control device includes a trouble detector for detecting that the wheel control is in a situation unable to control the speed of the wheels normally. A braking detector detects that a braking operation to brake the rotation of the wheels is executed. And, a torque interruption control reduces the torque transmission capacity by the connection mechanism, when it is detected by the trouble detector that the wheel control cannot control the speed of the wheels normally and when it is detected by the braking detector that the braking operation to brake the rotation of the wheels is executed.

32 Claims, 6 Drawing Sheets

U.S. PATENT DOCUMENTS

| | | | |
|---|---|---|---|
| 4,676,353 A | | 6/1987 | Matsuda et al. |
| 4,732,248 A | * | 3/1988 | Yoshimura et al. ......... 477/171 |
| 4,766,988 A | * | 8/1988 | Seibert ................... 477/175 X |
| 4,899,279 A | * | 2/1990 | Cote et al. .................... 701/37 |
| 5,317,937 A | * | 6/1994 | Yoshizawa et al. ......... 477/120 |
| 5,362,287 A | * | 11/1994 | Tanaka et al. .............. 477/175 |
| 5,498,217 A | * | 3/1996 | Maruyama et al. ......... 477/169 |
| 5,586,953 A | * | 12/1996 | Abo ........................... 477/47 |
| 6,102,831 A | * | 8/2000 | Wakahara et al. .......... 477/169 |

FOREIGN PATENT DOCUMENTS

| | | | | |
|---|---|---|---|---|
| JP | 58-26661 | | 2/1983 | |
| JP | 60-101356 | | 6/1985 | |
| JP | 64-36532 | | 2/1989 | |
| JP | 2-102960 | | 4/1990 | |
| JP | 402124331 | * | 5/1990 | ................. 477/187 |
| JP | 2-227342 | | 9/1990 | |
| JP | 3-193584 | | 8/1991 | |
| JP | 3-204458 | | 9/1991 | |
| JP | 4-138745 | | 5/1992 | |
| JP | 6-109113 | | 4/1994 | |
| JP | 6-156121 | | 6/1994 | |
| JP | 7-63088 | | 3/1995 | |
| JP | 7-237471 | | 9/1995 | |
| JP | 8-261322 | | 10/1996 | |
| JP | 11-82707 | | 3/1999 | |

* cited by examiner

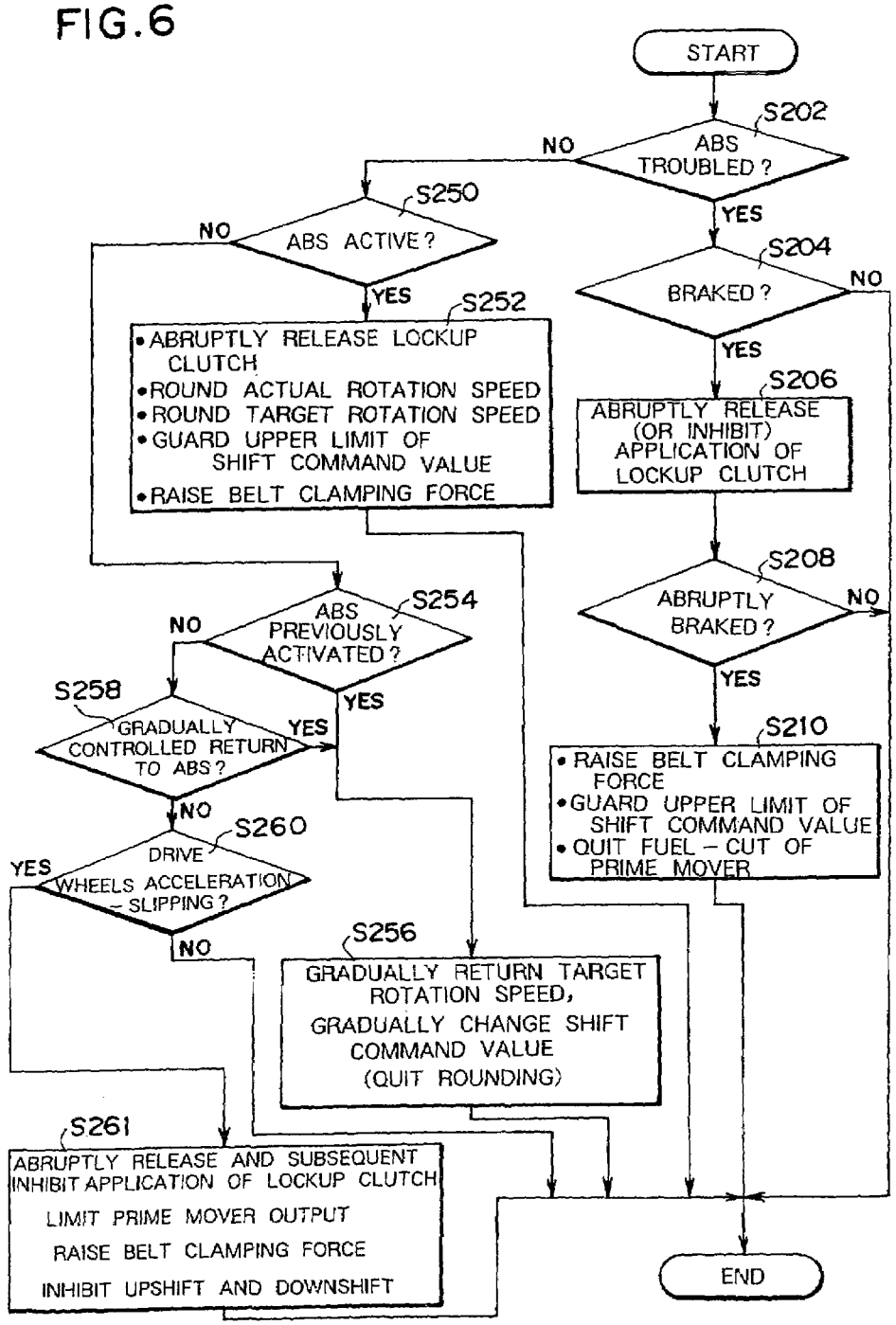

CONTROLLER FOR DRIVING SYSTEM OF VEHICLE

TECHNICAL FIELD

This invention relates to a device for controlling a drive line having a mechanism for braking wheels in accordance with the state of a vehicle such as a vehicle speed and the speed or slip ratio of the wheels or for increasing/decreasing the braking force.

BACKGROUND ART

As well known in the art, a vehicle such as an automobile makes the driving such as accelerating, decelerating and turning runs by transmitting its torque using the frictional force between its wheels and the road surface. In other words, the vehicle cannot transmit the torque over the frictional force between the wheels and the road surface. For stable runs, therefore, the driving torque or the braking torque has to be kept within such a range as to establish no slip of the wheels.

The driving torque is raised either by increasing the output of a power source such as an internal combustion engine or by augmenting the gear ratio. On the other hand, the braking torque rises according to the depression of a brake pedal or the gear ratio in the decelerating state. In either case, the torque is generally controlled by the manual operation of a driver. However, the friction coefficient of the road surface on which the vehicle is driving changes every moment, and the driving torque or the braking torque based on the manual operation may exceed the torque which is determined by the friction coefficient of the road surface. In order to keep a stable running even in this case, the driving torque or the braking torque is controlled not by the manual operation.

One example of the control for suppressing the driving torque is the so-called "traction control", and one example of the control for suppressing the braking control is one in the device called "anti-lock brake system (ABS)". One example of the anti-lock brake system is described in Japanese Patent Laid-Open No. 58-26661. When the engine output is raised for starting or accelerating the vehicle on a road surface of a low friction coefficient (or the so-called "low μ road"), for example, the idle rotation or slip of a wheel is detected in the former control by a speed sensor. The idling or slipping wheel is braked by feeding the oil pressure to its brake actuator, and the output torque is lowered by delaying the ignition timing of the engine. In the latter control for avoiding the locking of a wheel, on the other hand, the locked state of the wheel is detected on the basis of the vehicle speed and the wheel speed of the case in which a braking operation (or braking) is done, and the braking force on the locked wheel is lowered by releasing the brake actuator for the wheel, so that the braking torque is made lower than the value determined on the basis of the road friction coefficient to keep the gripping force of the wheel.

Either of these is a control corresponding to the so-called "wheel control means" for suppressing the rotation of the wheel or for lowering the braking force to stop the rotation of the wheel. When the wheel control means of this kinds acts, therefore, the load torque in the drive line from the engine to the drive wheel rises or drops on the contrary. In the contents of the control, however, when the driving torque or the braking torque is relatively higher than the road friction coefficient, the rotation of the wheel is kept while keeping the grip of the road surface by suppressing the torque acting on the wheels. Even in the case of an abrupt braking on a low μ load, therefore, the rotation of the wheel can be kept to continue the rotation of the engine connected to the drive wheel thereby to avoid or suppress from inviting an engine stall.

When the aforementioned device (or system) for controlling the rotation of the wheel fails or has a malfunction in its control, however, the rotation of the wheel may abruptly drop or may be stopped. As the rotation of the drive wheel thus changes, the speed of the engine is abruptly lowered to highly possibly invite the engine stall as the vehicle on which the aforementioned wheel control means such as the ABS is not mounted. On the other hand, the abrupt drop in the speed of the drive wheel is caused when a high braking force acts on the drive wheel so that a transmission to which the drive wheel is connected is subjected to such a high torque as to stop the rotation of the transmission. As a result, the transmission may be damaged by an excessive torque when the braking is done with the aforementioned wheel control means being in the state of failure or malfunction. In the transmission such as a continuously variable transmission (CVT) in which the torque is transmitted by a frictional force or a shearing force of an oil film, for example, the rotary member such as a belt or pulleys may be highly possibly damaged.

Thus, the device (or system) such as the ABS for controlling the rotation of the wheel can keep the rotation of the wheel, when it normally functions, but exerts serious influences to the entirety of the drive line when it comes into a failure or malfunction. However, the control has not been clarified in that of the prior art that the failure or malfunction, if any, can be properly coped with.

This invention has been conceived in view of the background situations thus far described, and has an object to provide a control device which can keep the rotation of a power source even when a vehicle is braked with means for controlling the rotation of a wheel being troubled by a failure.

DISCLOSURE OF THE INVENTION

In order to achieve the aforementioned object, according to this invention, there is provided a control device for a drive line of a vehicle, in which a drive line from a power source to drive wheels includes wheel control means for controlling the speed of said wheels, and a connection mechanism for increasing/decreasing a torque transmission capacity between said power source and the drive wheels, comprising: trouble detecting means for detecting that said wheel control means is in a situation unable to control the speed of said wheels normally; braking detecting means for detecting that a braking operation to brake the rotation of said wheels is executed; and torque interruption control means for reducing the torque transmission capacity by said connection mechanism, when it is detected by said trouble detecting means that said wheel control means cannot control the speed of said wheels normally and when it is detected by said braking detecting means that the braking operation to brake the rotation of said wheels is executed.

When the vehicle is braked such that the rotation of the wheel cannot be normally controlled the rotation of the wheel may abruptly drops. According to the control device of this invention, however, the torque transmission capacity by the connection mechanism interposed in the drive line is reduced so that the braking force acting on the wheel is hardly transmitted to the power source, that is, the drop in the rotation of the power source is suppressed so that the stall of an internal combustion engine, if used as the power source, is avoided in advance.

In this invention, moreover, said power source can include an internal combustion engine adapted to be selectively interrupted in its fuel feed at a deceleration time, and the control device can further comprise: condition satisfaction deciding means for deciding the satisfaction of a predetermined condition; and fuel feed returning means for executing the fuel feed by releasing the interruption of the fuel feed to said internal combustion engine, when it is detected by said trouble detecting means that said wheel control means cannot control the speed of said wheels normally, when it is detected by said braking detecting means that the braking operation to brake the rotation of said wheels is executed and when the satisfaction of said predetermined condition is decided by said condition satisfaction deciding means.

With this construction, if the control of the wheel is troubled, the fuel feed to the internal combustion engine is reopened instantly as the braking is detected. Therefore, the autonomous rotation of the internal combustion engine by reopening the fuel feed can be abruptly promoted to prevent the engine stall in advance at the braking time in the doubled state of the wheel control means.

According to this invention, moreover, there is provided a control device for a drive line of a vehicle, in which a drive line from a power source to drive wheels includes wheel control means for controlling the speed of said wheels, and a continuously variable transmission with a lockup clutch, comprising: trouble detecting means for detecting that said wheel control means is in a situation unable to control the speed of said wheels normally; braking detecting means for detecting that a braking operation to brake the rotation of said wheels is executed; and release control means for controlling said lockup clutch to a release side so as to lower the torque transmission capacity of said lockup clutch, when it is detected by said trouble detecting means that said wheel control means cannot control the speed of said wheels normally and when it is detected by said braking detecting means that the braking operation to brake the rotation of said wheels is executed.

When the vehicle is braked such that the rotation of the wheel cannot be normally controlled, the rotation of the wheel may abruptly drops. According to the control device of this invention, however, the lockup clutch is controlled to the release side to reduce the torque transmission capacity as the entirety of the drive line so that the braking force acting on the wheel is hardly transmitted to the power source, that is, the drop in the rotation of the power source is suppressed so that the stall of an internal combustion engine, if used as the power source, is avoided in advance.

In addition to this construction, the control device can further comprise: condition satisfaction deciding means for deciding the satisfaction of a predetermined condition; and continuously variable transmission control changing means for changing the control contents of said continuously variable transmission, when it is detected by said trouble detecting means that said wheel control means cannot control the speed of said wheels normally, when it is detected by said braking detecting means that the braking operation to brake the rotation of said wheels is executed and when the satisfaction of said predetermined condition is decided by said condition satisfaction deciding means.

Said continuously variable transmission control changing means can include means for increasing the power transmission capacity in said continuously variable transmission.

On the other hand, said continuously variable transmission control changing means can include means for limiting the shift in said continuously variable transmission to a predetermined state.

By the braking operation with the wheel control means being troubled, therefore, a high torque may act on or an abrupt shift may occur in the continuously variable transmission of the drive line. With the aforementioned construction, however, it is possible to prevent in advance a shortage of the torque capacity, or an abrupt shift in the continuously variable transmission, an accordingly caused slip and an accompanying damage.

In addition to the aforementioned construction, in this invention, said condition satisfaction deciding means can include means for deciding the satisfaction/dissatisfaction of a plurality of conditions contained in said condition, individually, and the control device can further comprise: one communication line for transmitting the states of satisfaction/dissatisfaction of those plural conditions.

With this construction, the construction of a wire harness for information transmissions can be simplified to lower the cost.

In addition to the aforementioned individual constructions, the control device of this invention can further comprise: rounding means for rounding input parameters for controlling said continuous transmission means; and shift control means for controlling the shift of said continuously variable transmission on the basis of the input parameters rounded by said rounding means, when it is not detected by said trouble detecting means that said wheel control means cannot control the speed of said wheels normally and when said wheel control means controls the rotation of said wheels.

With the control device being thus constructed, when it is decided that the control of the wheel by the wheel control means can normally act, the information of input parameters (e.g., the vehicle speed, the wheel speed, the rotation speed of the power source, or the shift command value) for executing the shift control of the continuously variable transmission are used not as they are obtained from the sensors but as they are rounded before use. It is, therefore, possible to prevent the slip in the continuously variable transmission and to suppress the transient shock.

Here, in the case of the engine rotation speed information, the original information itself has already been rounded so that no influence of pulsations may appear, and is used as the "raw information" for the various controls. Therefore, the "rounding treatment", as termed herein, implies that the information generally used is further rounded for retaining the stability of the continuously variable transmission at the control time by the wheel control means.

BRIEF DESCRIPTION OF THE DRAWINGS

FIG. 6 is a flow chart for explaining a control example of this invention to be executed on the vehicle having the drive line and the control line shown in FIG. 4 and FIG. 5.

BEST MODE FOR CARRYING OUT THE INVENTION

Figure 1:
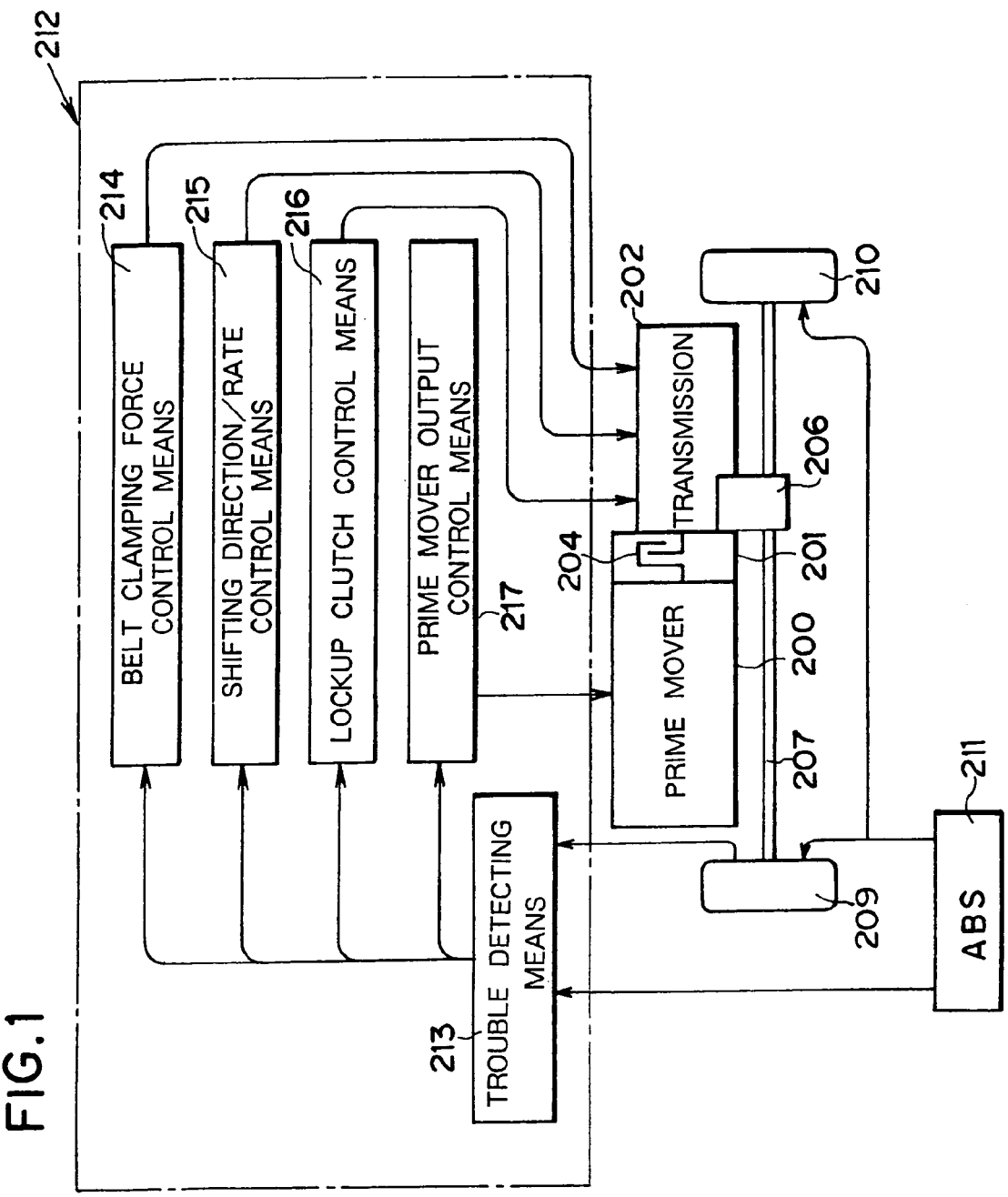
FIG. 1 is a diagram schematically showing a drive line and a control line of a vehicle, to which this invention is applied.

This invention will be described more specifically in the following. FIG. 1 shows a drive line and a control line of a vehicle, to which this invention is applied A transmission 202 is connected through a connection mechanism 201 to the output side of a prime mover 200. This prime mover 200 is exemplified by an internal combustion engine such as a gasoline engine or a Diesel engine, which is so constructed that it is enabled to control an output torque electrically by controlling an air intake, a fuel feed and an ignition timing electrically. In order to improve the fuel economy, on other hand, the prime mover 200 is also constructed that it interrupts the fuel feed at a deceleration with the (not-shown) accelerator pedal being released, on condition that the vehicle speed, the engine water temperature or the like is at a predetermined value or higher.

On the other hand, the connection mechanism 201 is provided either for turning the prime mover 200 even when the vehicle stops or for smoothing the rise in the drive torque at a starting time. The connection mechanism is constructed of a fluid coupling (e.g., a torque converter) having a friction clutch (i.e., an input clutch) or a lockup clutch 204 to be electrically controlled. If the input clutch or the lockup clutch 204 is completely applied, the connection mechanism 201 has its torque transmission capacity maximized to connect the prime mover 200 and the transmission 202 mechanically. In a partial applied state (i.e., a slipping state) or in a released state, on the other hand, the torque transmission capacity drops. In the lowest state, the torque transmission is interrupted between the two.

Figure 2:
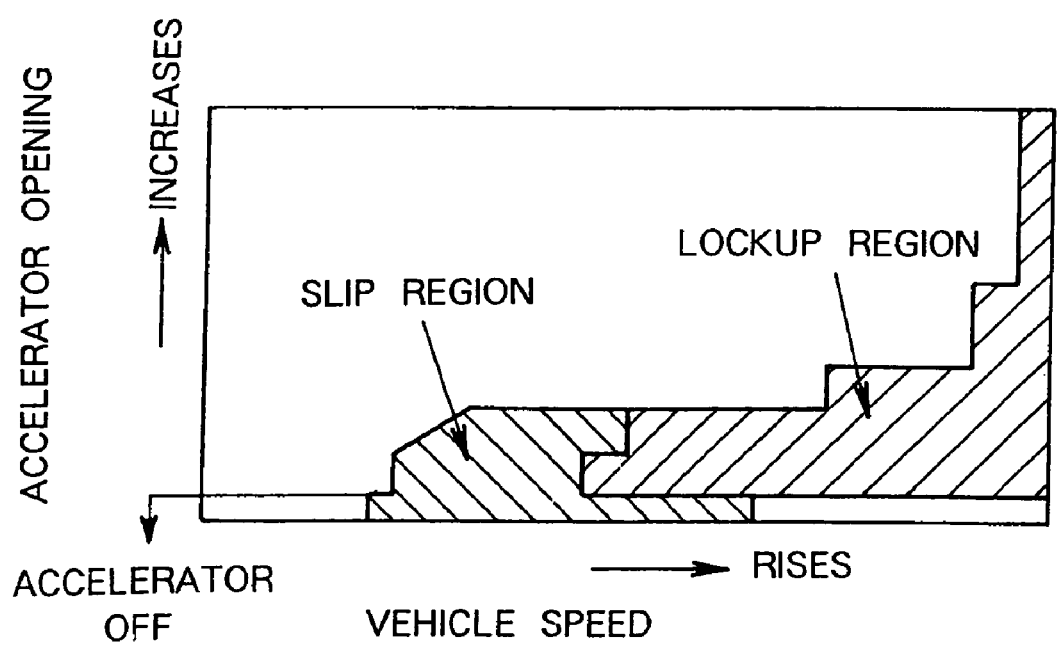
FIG. 2 is a diagrammatic drawing illustrating a lockup region, in which a lockup clutch is applied, and a slip region in which the same is partially applied

Here will be further described the aforementioned lockup clutch 204. At the lower speed of the prune mover 200 or at the higher load (in terms of the throttle opening or the accelerator opening) of the prime mover 200, on the other hand, the vibrations or noises become the larger to deteriorate the riding comfortableness of the vehicle. Therefore, there is predetermined a running range in which the lockup clutch 204 is applied. One example is illustrated in FIG. 2, in which the lockup clutch 204 is completely applied in a lockup region and is controlled to the so-called "partial applied state" in a slip region. The controls of these apply/release and partial apply can be made with an oil pressure, and a hydraulic control unit therefore can be exemplified by those which are known in the prior art.

The transmission 202 is one for amplifying and outputting the output torque of the prime mover 200 and for lowering the running speed of the prune mover 200 in a high-speed running state, and can adopt a discontinuous type or continuous type transmission mechanism. As thin continuously variable transmission, moreover, there can be adopted: the belt type continuously variable transmission in which a belt (not-shown) is made to run on a drive pulley (or a primary pulley: not-shown) and a driven pulley (or a secondary pulley: not-shown) having width-changeable grooves (not-shown); or a toroidal type (or a traction type) continuously variable transmission in which power rollers (although none of them are shown) are sandwiched between an input disk and an output disk having toroidal faces to set a gear ratio according to the contact point radius between the individual disks and the power rollers by inclining the power rollers.

To the (not-shown) output member of the aforementioned transmission 202, there is connected a differential device 206, from which drive axles 207 and 208 are extended to the right and left to carry drive wheels 209 and 210. Therefore, the output torque of the prime mover 200 is transmitted through the connection mechanism 201, the transmission 202, the differential device 206 and the drive axles 207 and 208 to the drive wheels 209 and 210 so that the drive wheels 209 and 210 rotate. The connection mechanism 201, the transmission 202, the differential device 206 and the drive axles 207 and 208 thus transmitting the torque correspond to the drive line of this invention. Moreover, the transmission torque between the prime mover 200 and the drive wheels 209 and 210 can be changed continuously or stepwise from 0% to 100% in accordance with the applied state of the clutch such as the lockup clutch 204 in the aforementioned connection mechanism 201.

The aforementioned drive line is provided with wheel control means for controlling the rotations of the drive wheels 209 and 210. The wheel control means of this kind is exemplified by: a traction control device raises the braking force to suppress the idle rotations of the drive wheels 209 and 210 by controlling it electrically and lowers the output torque of the prime mover 200 temporarily at the same time; or an anti-lock brake system (ABS) 211 for lowering the braking force by controlling it electrically to prevent the lock of the wheels.

Here, the aforementioned vehicle is provided like the ordinary vehicle with various mechanisms and devices necessary for its running, although not especially shown in the Fig. Specifically, the vehicle is provided with the shift control device, the braking device (or the brake device), the steering device, the various sensors for detecting the controlled states or controls of those devices, a sensor for detecting the vehicle speed or a sensor for detecting the speeds of the wheels, a sensor for detecting the temperature of the prime mover 200, a sensor for detecting the speed of the prime mover 200, and sensors for detecting the input speed and the output speed of the continuously variable transmission.

The wheel control means such as the aforementioned ABS 211 functions to apply the braking force to the wheels or to lower the braking force on the contrary so that it raises the braking force or cannot lower the braking force if it is troubled by a failure or a control malfunction. In this case, the speed of the drive wheels 209 and 210 or the prime mover 200 may abruptly drop. Therefore, a control device 212 according to this invention is provided with individual means, as will be described in the following.

Specifically, this control device 212 is so constructed mainly of a microcomputer, for example, that it operates according to input data (or input parameters) or data and programs stored in advance and outputs the operation results as control signals. According to the programs, moreover, the control device 212 performs various functions. The functional means. which is as shown in FIG. 1, is provided with one example of the aforementioned vehicle control means, i.e., trouble detecting means 213 for detecting the trouble such as the failure of the ABS 211 or the control malfunction.

In case the aforementioned transmission 202 is constructed of the belt type continuously variable transmission, on the other hand, the functional means is provided with belt clamping force control means 214 for controlling the belt clamping force (or the damping force). More specifically, the belt type continuously variable transmission transmits the torque through the belt made to run on the paired pulleys. It is, therefore, necessary to apply such a tension to the belt as is neither excessive nor short for the torque to be transmitted. For this necessity, an oil pressure is applied to narrow the groove width of the driven pulley, so that the frictional force, as caused when the pulley clamps the belt, between the pulleys and the belt is controlled to match the transmission torque. Generally, the clamping force is controlled according to the accelerator opening or the throttle opening. Therefore, the belt clamping force control means 214 is constructed to control the oil pressure of the driven pulley. Here, the speed change is executed by controlling the oil pressure for changing the groove width of the drive pulley to change the groove width of the driven pulley in accordance with that of the drive pulley. Therefore, the gear ratio or the shifting rate is suitably set by controlling the oil pressure of the drive pulley.

There is further provided shifting direction/rate control means 215. Specifically, the upshift for lowering the gear ratio and the downshift for augmenting the gear ratio is the shifting direction, and the changing rate of the gear ratio per unit time is the shifting rate. These controls are made in the aforementioned belt type continuously variable transmission by controlling the oil pressure for changing the groove width of the drive pulley in various sizes.

Still moreover, there is provided lockup clutch control means 216. This is the means for controlling the lockup clutch 204 of the aforementioned connection mechanism 201 into the applied/released and partially applied states. In the clutch of the type to be controlled by the pressure difference between the oil pressures on the applied side and on the released side across the lockup clutch 204, for example, the applied/released and partially applied states are established by controlling the level of the oil pressure on the released side.

There is further provided prime mover output control means 217 for controlling the output of the prime mover 200. In short, this prime mover output control means 217 is constructed to control the output of the prime mover 200 by an electric control. The prime mover output control means 217 controls the feeds of intake air and fuel to the prime mover 200 and the interruption/reopening of the feeds, and execute the control of the delay/advance of the ignition time for the gasoline engine.

These individual control means 214, 215, 216 and 217 are constructed to operate on the basis of the detection signals of the trouble detecting means 213 and the running state of the vehicle. One example of the controls is shown as a flow chart in FIG. 3. In this control example shown in FIG. 3: the ABS 211 is adopted as the wheel control means; a torque converter with the lockup clutch 204 is adopted as the connection mechanism 201; the belt type continuously variable transmission is adopted as the transmission 202; the target vehicle is which the prime mover 200 has an internal combustion engine capable of executing the interruption of the fuel feed selectively at a deceleration time: and it is the control example when a trouble such as a failure occurs in the ABS 211.

First of all, therefore, it is decided (at Step S101) whether or not the ABS 211 is troubled. This decision is made by the aforementioned trouble detecting means 213. In the case of no trouble, that is, if the answer of at Step S101 is NO, this routine is left. If the ABS 211 is troubled so that the answer of at Step S101 is YES, an the contrary, it is decided (at Step S102) whether or not a braking operation is performed. This decision can be made on whether or not the not-shown brake switch is outputting an ON signal or whether or not a sensor for detecting the depression of the not-shown brake pedal is outputting a signal.

If no braking operation is performed so that the answer of Step S102 is NO, this routine is left. If the answer of Step S102 is YES, on the contrary, the lockup clutch 204 is abruptly released, or the application (or engagement) of the lockup clutch 204 is inhibited (at Step S103). In short, this control is to prevent the braking torque for stopping the rotation of the wheels from excessively acting on the prime mover 200 through the drive line from the prime mover 200 to the drive wheels 209 and 210, by lowering the transmission capacity of the torque in the drive line abruptly. Even when the running state of the vehicle is in the lockup region in FIG. 2, for example, the lockup clutch 204 is instantly released, before the vehicle speed drops so that the running state passes the lockup region. Here, the lockup clutch 204 may be controlled, instead of being released, to the partially applied state of a large slippage (i.e., of a large input/output speed difference). This control likewise applies to the case in which a fiction clutch (or an input clutch) is adopted as the connection mechanism 201.

In the braking operation with the ABS 211 being troubled, the control to reduce the braking torque for preventing the drive wheels 209 and 210 from being locked is not properly made. As a result, the drive wheels 209 and 210 maybe locked depending upon the state of the road surface. If, in this case, the prime mover 200 is mechanically directly connected to the drive wheels 209 and 210, the braking torque to stop the rotations of the drive wheels 209 and 210 acts directly to stop the rotation of the prime mover 200 so that the speed of the prime mover 200 abruptly drops. An extreme case may lead to the engine stall. By releasing the lockup clutch 204 abruptly, on the contrary, the torque transmission capacity of the drive line is lowered to relax the degree at which the speed of the prime mover 200 is lowered by the braking torque, so that the autonomous rotation of the prime mover 200 can be kept.

Next, it is decided (at Step S104) whether or not predetermined conditions are satisfied. These conditions are to shorten the time period for which the speed of the prime mover 200 is caused to reach the minimum value for keeping the autonomous rotation by the braking operation, for example, when the aforementioned lockup clutch 204 is applied. The conditions are any or all that the vehicle is abruptly braked that the vehicle speed is at a predetermined reference value or lower, and that the slip ratio of the drive wheels 209 and 210 is at a predetermined value or higher. Here, it is decided from the depression rate of the brake pedal whether or not the braking is abrupt. Moreover, the decision of the abrupt braking may be additionally made on the basis of a decelerating state or a control state for causing a deceleration, that the vehicle acceleration is at a predetermined value or lower (or the deceleration is at a predetermined value or higher), that the fluid pressure for activating the brake is at a predetermined value or higher, that the stroke of the brake pedal is at a predetermined value or higher, or that the depressing force of the brake pedal is at a predetermined value or higher.

This routine is left, if none of the conditions is satisfied so that the answer of Step S104 is NO. If any of the conditions is satisfied or if all the conditions are satisfied, on the contrary, the answer of Step S104 is YES. If the feed of the fuel to the prime mover 200 is then interrupted because of a decelerating state, the so-called "fuel-cut control" is instantly quit to execute abrupt return from the fuel-cut (at Step S105). In place of or together with this, alternatively, there is executed (at Step S106) the control to raise the belt clamping force in the belt type continuously variable transmission constructing the transmission 202. In place of or together with this, moreover, there is executed (at Step S107) the control to limit the shifting rate of the downshift to augment the gear ratio at the transmission 202.

Even if the lockup clutch 204 is abruptly released, specifically, the inevitable control delay may further lower the speed of the prime mover 200. If the fuel feed to the prime mover 200 is then interrupted, the possibility to reach the engine stall is further enhanced. In order to avoid the engine stall in advance, therefore, the fuel feed is instantly reopened. Step S105 provides a control therefore.

On the other hand, the abrupt braking is caused by a high braking torque. If the torque transmission capacity of the drive line is held in a considerably high state by the delay in the release of the lockup clutch 204, therefore, a high torque acts on the transmission 202. In case the transmission 202 is constructed of the aforementioned belt type continuously variable transmission, on the other hand, its belt damping force is set according to a demand drive amount e.g., the accelerator opening) for the vehicle. Because of the small demand drive amount at the braking time, therefore, the belt clamping force is in the lowered state. As a result, the belt clamping force for the torque inputted from the output side by the abrupt braking may become short to cause a slip between the belt and the pulleys, and these belt and pulleys may be damaged. Therefore, the belt clamping force is raised to prevent the damage of the belt type continuously variable transmission. Step S106 provides a control therefor.

Moreover, the gear ratio in the transmission 202 is usually augmented by executing the downshift according to the drop in the vehicle speed. If the abrupt braking is made with the ABS 211 being troubled, as described hereinbefore, it is decided from an abrupt drop of the speed of the drive wheels 209 and 210, i.e., the output speed of the transmission 202 that the vehicle speed has dropped. Accordingly, an abrupt downshift in the transmission 202 is derided. The drop of the vehicle speed in this case is decided on the basis of the lock of the drive wheels 209 and 210 or the drop of the speed in a similar state of the lock and is such an abrupt deceleration as will hardly occur in the ordinary run, so that the downshift in the transmission 202 is also abrupt. If this downshift is executed as it is, the belt and the pulleys may be slipped and damaged at the belt type continuously variable transmission. At Step S107, therefore, there is made the control to limit the shifting rate in the transmission 202.

Here, the controls of Step S108 to Step S107 may be executed according to the last state of the prime mover 200 or the transmission 202 just before or the control contents, but all of them need not be executed. In other words, if the braking control is made with the wheel control means being troubled so that the speed of the prime mover 200 abruptly drops to cause any disadvantage, a suitable control for avoiding the disadvantage may also be executed on the basis of the decision on the satisfaction of conditions at Step S104.

Figure 3:
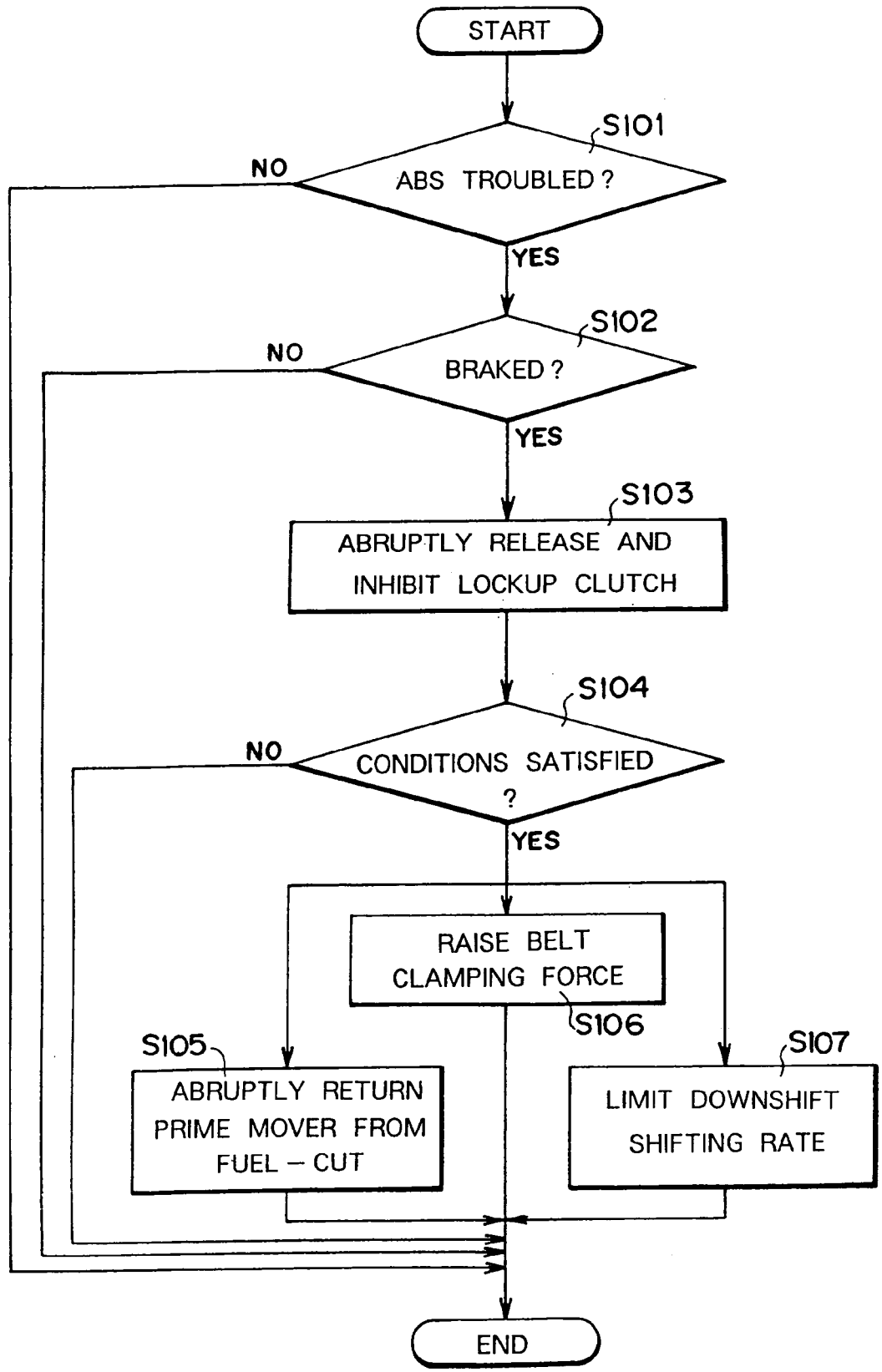
FIG. 3 is a flow chart for explaining a control example of this invention to be executed on the vehicle shown in FIG. 1.

According to the control device of this invention for executing the controls of FIG. 3, as has been described hereinbefore, when the vehicle is braked with the wheel control means being troubled by the failure of the ABS 211, the torque transmission is interrupted or reduced between the drive wheels 209 and 210 and the prime mover 200. Even if the drive wheels 209 and 210 are locked or brought to a similar state by the trouble of the wheel control means, therefore, the rotation of the prime mover 200 can be kept by blocking or relaxing the action of the braking torque on the prime mover 200. Even if the delay in the drop of the torque transmission capacity of the drive line allows the braking torque to act on the prime mover 200 to any extent, the fuel feed to the prime mover 200 is instantly reopened, if stopped, so that the engine stall can be avoided in advance. In case the transmission 202 is constructed of the belt type continuously variable transmission, moreover, the belt clamping force is raised, but the downshift rate is restricted. Therefore, the belt does not slip even if a high torque accompanying the braking in the troubled state acts, and an abrupt shift is avoided so that the continuously variable transmission can be prevented from being damaged and can keep its durability.

Figure 4:
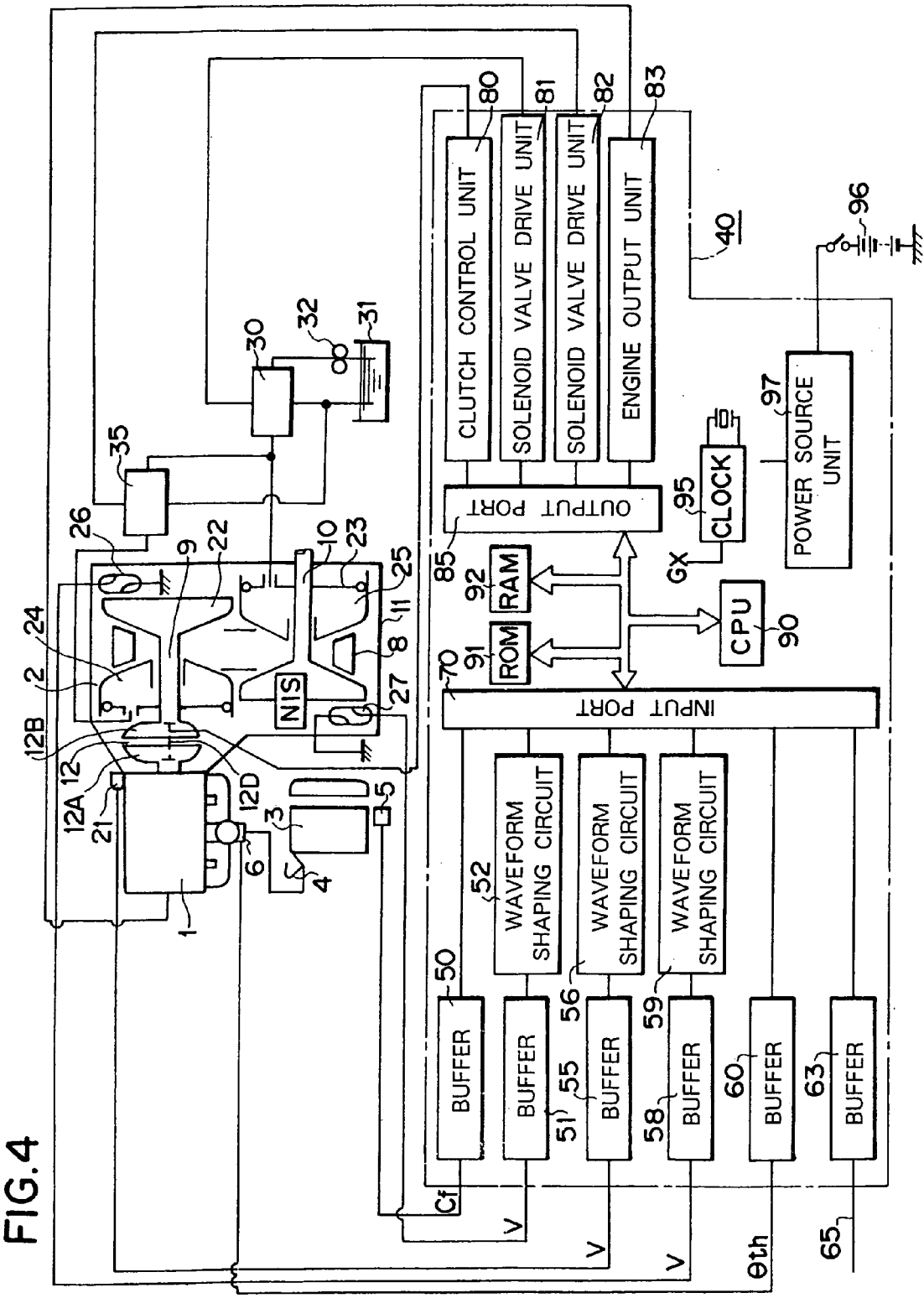
FIG. 4 is a diagram schematically showing another drive line and another control line of a vehicle, to which this invention is applied.
Figure 5:
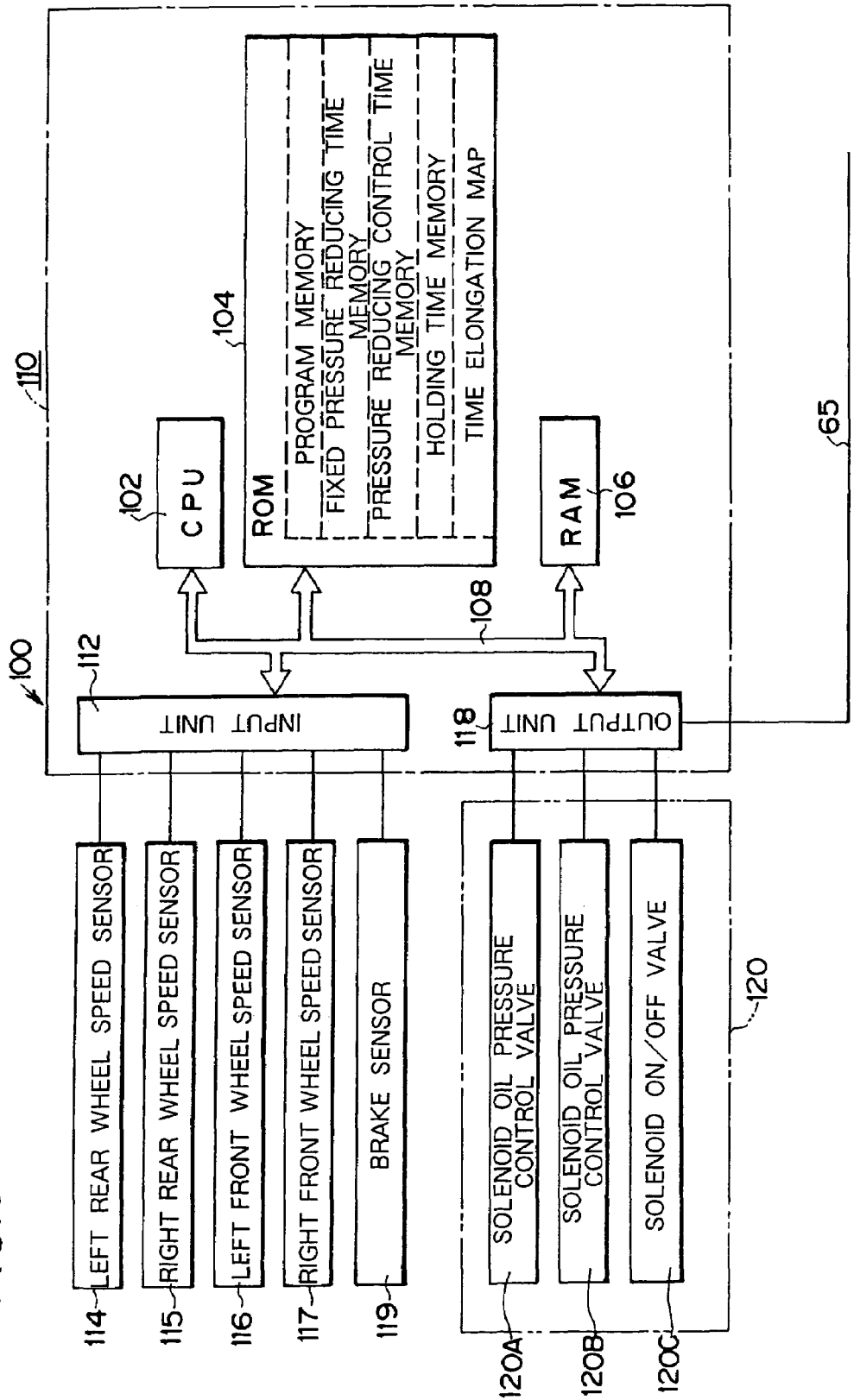
FIG. 5 is a block diagram showing a control line of an anti-lock brake system of the same.

Here will be described another example in which this invention is further embodied. A portion of the drive line and the control line in this example are shown in FIG. 4 and FIG. 5. In FIG. 4, there is connected to the output side of an engine 1 a continuously variable transmission (as will be called the "CVT") 2. In the vicinity of a driver's seat 3, on the other hand there are arranged an accelerator pedal 4 for controlling the output of the engine 1, and a shift position sensor 5 for detecting the shift position which is selected in the CVT 2. The depression of the aforementioned accelerator pedal 4 is converted into electric signals so that the throttle opening is controlled according to the depression of the accelerator pedal 4. A throttle sensor 6 is provided for detecting the throttle opening. Here, the aforementioned CVT 2 is a belt type continuously variable transmission for transmitting the torque through a belt a. This continuously variable transmission has its input shaft 9 connected directly to the output shaft (i.e., a turbine runner 12B) of a torque converter 12.

An electronic control unit 40 is provided for controlling the engine 1 and the CVT 2 integrally. This electronic control unit 40 is constructed mainly of a microcomputer. The control of the engine 1 by the electronic control unit 40 is basically to output the driving force according to the accelerator opening. The remaining controls are the fuel-cut control to interrupt the fuel feed so as to improve the fuel economy, when the predetermined conditions are satisfied, and to limit the engine output independently of the depression of the accelerator pedal, if the predetermined conditions are satisfied, as will be described hereinafter.

The torque converter 12 is provided with a pump impeller 12A, the turbine runner 12B and a lockup clutch 12D, so that the torque is transmitted by a fluid to the turbine runner 12B from the pump impeller 12A which is connected directly to the crankshaft of the engine 1. The lockup clutch 12D is applied/released with the output oil pressure of the (not-shown) hydraulic circuit which is activated on the basis of a command from the aforementioned electronic control unit 40. When the lockup clutch 12D is applied, the member on the input side and the member on the output side of the torque converter 12 are mechanically coupled directly to each other. The construction of the hydraulic circuit itself for applying or releasing the lockup clutch 12D is well known in the art, and its detailed description will be omitted.

The aforementioned CVT 2 is provided with an output shaft 10 and is housed in a housing 11. There is further provided an engine rotation speed sensor 21 for detecting the speed of the engine 1 and outputting it as an electric signal. The CVT 2 is further provided an input side pulley 22 and an output side pulley 23, on which the belt 8 is made to run and which can change their groove widths. The CVT 2 pumps the oil pressure to and from individual oil pressure chambers 24 and 25 to enlarge/reduce the groove widths thereby to set the tension (or the damping force) of the belt 8 to a value (or a clamping force) according to the demand drive amount and to set the gear ratio to a value for achieving a target input speed. In order to determine the actual gear ratio thus set at the CVT 2, there are provided a speed sensor 26 for detecting the speed of the input side pulley 22 (or the input shaft 9) and a speed sensor 27 for detecting the speed of the output side pulley 23 (or the output shaft 10).

There is provided a line pressure control valve 30 for producing an oil pressure to be fed to the oil pressure chamber 25 of the aforementioned output side pulley 23, i.e., an oil pressure for controlling the clamping force of the belt 8. This line pressure control valve 30 is constructed to regulate the oil pressure, as pumped and compressed from an oil tank 31 by an oil pump 32, to an oil pressure according to the accelerator opening. There is further provided a flow control valve 35 for producing an oil pressure to be fed to the oil pressure chamber 24 of the input side pulley 22, i.e., an oil pressure for controlling the gear ratio. This flow control valve 35 is a solenoid valve for controlling the flow rate of the line pressure to the oil pressure chamber 24 in the input side pulley 22. The flow control valve 35 sets a predetermined gear ratio by pumping the line pressure to the aforementioned oil pressure chamber 24 so that the input speed of the CVT 2 may be the target value.

Specifically, the effective diameter of the input side pulley 22 is changed by the flow control valve 35, and the effective diameter of the output side pulley 23 is so changed according to the change in the effective diameter of the input side pulley 22 that the belt 8 may not become loose. Thus, the gear ratio of the CVT 2 is changed.

Here in the aforementioned CVT 2, like the ordinary continuously variable transmission, the speed change is executed by feedback-controlling the gear ratio on the basis of the deviation between a target input side speed Nint and an actual input side speed Nin. Here, this speed change is limited by the satisfaction of the predetermined conditions, as will be described hereinafter.

The aforementioned electronic control unit 40 is provided with: a clutch control unit 80 for controlling the aforementioned lockup clutch 12D; a solenoid valve drove unit (i.e., belt clamping force control means) 81 for electrically controlling the line pressure control valve 30 for adjusting the clamping force of the aforementioned belt; a solenoid valve drive unit (i.e., shift control means containing the shifting direction and the shifting rate) 82 for electrically controlling the flow control valve 35 for changing the aforementioned gear ratio; an engine output control unit 83 for controlling the output state of the engine; and an output port 85 for outputting individual signals to those control units 80, 81, 82 and 83.

Moreover, the electronic control unit 40 is provided as its input line with: a buffer 50 for receiving a shift position signal Cf from the shift position sensor 5; buffers 51 and 58 for receiving rotation speed signals Nin and Nout from the individual rotation speed sensors 26 and 27 in the CVT 2; waveform shaping circuits 52 and 59 for shaping the waveforms of the outputs of those buffers 51 and 58; a buffer 60 for receiving a signal of an engine throttle opening θth from the throttle sensor 6; a buffer 55 for receiving an engine rotation speed signal Ne from the engine rotation speed sensor 21; a waveform shaping circuit 56 for shaping the waveforms of the output of the buffer 55; a buffer 63 for receiving a state signal S from a later-described anti-lock brake control device 100 through one communication line 65; and an input port 70 for receiving signals from the waveform shaping circuits 52, 56, 59 and 61.

The electronic control unit 40 is further provided with a CPU 90, a ROM 91 and a RAM 92 as pardons for recording programs to perform operations on the basis of the signals to be inputted/outputted from the aforementioned input port 70 and output port 85. Further provided are a clock 95 for outputting a clock signal to the aforementioned individual elements, and a power source unit 97 for feeding the electric power from a battery 96 to the individual elements.

On this vehicle, on the other hand, there is mounted the anti-lock brake control device (ABS) 100, as shown in FIG. 5. This control device 100 is provided with an anti-lock brake dedicated electronic control unit 110 including a CPU 102, a ROM 104, a RAM 106, and a bus 108 for connecting them. The ROM 104 is equipped in advance with a program memory, a fixed pressure reducing time memory, a pressure reducing control time memory and a holding time memory, and is stored in advance with an elongation time map. With the bus 108, there is further connected an input unit 112, to which there are inputted signals from front, rear, left and right four wheel rotation speed sensors 114, 115, 116 and 117 and signals from a brake sensor 119 for detecting the depression amount and depression rate of the (not-shown) brake pedal.

With the bus 108, moreover, there is connected an output unit 118, with which there is connected an ABS actuator 120 including a plurality of solenoid oil pressure control valves 120A and 120B and a solenoid ON/OFF valve 120C for controlling the brake oil pressure.

When the vehicle is so abruptly braked as to lack the wheels, the brake oil pressure is lowered in the known method by the anti-lock brake control device 100 to avoid the locking of the wheels so that the engine stall may be prevented. In short, the anti-lock brake control is executed.

Here, the specific construction and action of this anti-lock brake control device 100 per se are not especially different from those of the prior art so that their detailed description will be omitted.

The control device according to this invention detects the trouble such as the failure or the control malfunction of the aforementioned anti-lock brake control device 100 by the known method Moreover, the troubled state of the anti-lock brake control is transmitted, when it is decided that the control cannot be normally made, from the anti-lock brake control device 100 to the aforementioned electronic control unit 40 through the single communication line 65.

When a plurality of states are to be transmitted through the single communication line 65, the signal modes and the action states may be made to correspond one-to-one. In the state where the anti-lack brake control is normal and inactive and where the slip of the drive wheels is not detected, for example, the signal is always "High". In the state where the anti-lock brake control cannot normally act or is active, moreover, the signal is always "Low". When the slip is detected, moreover, the signal has run-pulses (i.e., a pulse signal to be turned ON/OFF for a short period). Moreover, the state of the operations is judged by repeating the Low signals and the High signals and changing the durations of the individual signals to longer or shorter ones to make the signal modes wholly into a plurality of different ones, by causing the modes of the different signals to correspond to the propriety of the anti-lock brake control and the presence/absence of the slips, and by decoding the modes of the signals received by the electronic control unit 40.

Thus, various pieces of information can be transmitted through only the signal communication line 65 to suppress the rise in the cost.

An example of the aforementioned control to be executed in FIG. 4 and FIG. 5 is shown in the flow chart of FIG. 6.

First of all, at Step S202, it is decided whether or not the anti-lock brake control can be normally made. This decision is made by the known method on whether or not the electric system of the aforementioned ABS actuator 120 on the execution of the anti-lock brake control is troubled, or on whether or not the sensor system for acquiring the information necessary for the anti-lock brake control is troubled.

When it is decided that the anti-lock brake control cannot be normally made, the routine advances to Step S204, at which it is decided on the basis of the ON/OFF of the brake sensor 119 whether or not the vehicle is braked. When the vehicle is not braked, no problem especially occurs so that this control flow is left. When it is decided that the vehicle is braked, however, considering the occurrence of the engine stall, the routine advances to Step S206, at which the lockup clutch 12D is abruptly released, and its application is also inhibited.

By this release of the lockup clutch 12D, the wheel side and the engine 1 are switched from the state, in which they are mechanically connected directly to each other, to the connected state in which they are coupled through the fluid of the torque converter 12, so that the engine stall can be effectively prevented. As in the aforementioned specific example described with reference to FIG. 3, the torque transmission capacity in the drive line between the wheels to be braked and the engine 1 drops to that through the fluid so that the braking torque hardly acts on the engine 1. As a result, even if the anti-lock brake control is troubled so that the braking oil pressure of the wheels cannot be reduced to stop the rotations of the wheels, the rotation of the engine I is not stopped, but the engine stall can be effectively prevented.

Here, an inevitable control delay is caused till the lockup clutch 12D comes into an unapplied state. Depending on either the state of the vehicle at the braked instant or the braked state, therefore, the rotation of the wheels may be stopped, and the speed of the engine 1 may be considerably lowered by the influence of the delayed release of the lockup clutch 12D. In order to cope with these situations, the following controls are executed.

Specifically, at next step S208, it is decided whether or not the aforementioned braking is abrupt. This decision can be made by differentiating the brake depression amount, as obtained from the aforementioned brake sensor 119, to estimate the depression rate of the brake pedal.

If the braking is not abrupt so that the answer of Step S208 is NO, this routine is left without any additional execution of the control other than that of the abrupt release of the lockup clutch 12D. If the braking is abrupt so that the answer of Step S208 is YES, on the contrary, the routine advances to Step S210, at which additional controls are executed. Specifically, there is raised the clamping force of the belt 8 at the CVT 2. This is executed by raising the oil pressure (or the line pressure) to be fed to the oil pressure chamber 25 of the output side pulley 23. As described hereinbefore, the line pressure is usually regulated to a level according to the accelerator opening or the throttle opening. At Step S210, however, the pressure regulation is intrinsic to that for the braking time in the troubled state of the wheel control, while being apart from that fundamental one. Thus, even a high torque is inputted from the wheel side (or the side of the output shaft 10), but the slip between the belt 8 and the individual pulleys 22 and 23 is prevented.

As the rotation of the wheels abruptly drops so that the vehicle speed to be detected on the basis of the speed of the wheels abruptly drops. As a result, a downshift to augment the gear ratio occurs, but its shifting rate is limited. In other words, an upper limit guard is set for the shift command value. As a result, the belt 8 and the individual pulleys 22 and 23 are prevented from slipping.

When the fuel feed to the engine 1 is interrupted because of a decelerating state, moreover, it is reopened. In other words, the fuel cut is quit. Then, the engine 1 autonomously rotates so that it is avoided from reaching the engine stall.

If it is decided at Step S202 that the anti-lock brake control device 100 is not troubled, on the other hand, the routine advances to Step S250, at which it is decided by the known method whether or not the anti-lock brake control is active or in the activation-required situation. When the wheel speed drops with respect to the vehicle speed, for example, the answer of Step S250 is YES.

When the and-lock brake control is active so that the answer of Step S250 is YES, the routine advances to Step S252. At Step S252, the lockup clutch 12D is abruptly released, and the actual rotation speed (or the input parameter), the target rotation speed and the shift command value for executing the control of the CVT 2 are individually rounded, so that the CVT 2 is subsequently controlled on the basis of these pieces of information thus rounded. Moreover, the clamping force of the belt 8 is raised. As a result, an abrupt speed change can be prevented in the situations where the anti-lock brake control is executed, that is, where the speed of the wheels abruptly changes. Therefore, the behavior of the vehicle under the anti-lock brake control is stabilized, and the slip of the belt 8 is prevented so that the belt 8 and the pulleys 22 and 23 can be improved in durability.

Here, if it is decided at Step S260 that the anti-lock brake control is not active, the routine advances to Step S254, at which it is decided whether or not the anti-lock brake system control was active in the preceding flow. If it is decided that the anti-lock brake control was active in the preceding flow, the anti-lock brake control has been executed till the decision, and it is the first time to detect that the control is inactive. Therefore, the preceding rounding operation is quit, and the raw information is then used as it is (at Step S256). Here for the return, the obtained values are gradually changed so that the target value may be avoided from stepwise changing at the time of the transfer from the state of the "rounding operation" to the state of the "non-rounding operation". In short, there is made the return gradual change control.

Here, the engine rotation speed information has already been rounded is its "original information" so that no influence of pulsations may appear, and is used as the "raw information" for the various controls. Therefore, the "rounding treatment", as termed herein, implies that the information generally used is further rounded for retaining the stability of the control of the CVT 2 at the anti-lock brake control time.

When the anti-lock brake control is not made in the preceding flow so that the answer of Step S254 is NO, on the other hand, the routine advances to Step S258, at which it is decided whether or not the aforementioned return gradual change control is being executed. If this answer of Step S258 is YES, the routine advances to the aforementioned Step S256. If the answer of Step S258 is NO, the routine advances to Step S260, at which it is decided whether or not the drive wheels are acceleration-slipping. If the drive wheels are acceleration-slipping so that the answer of Step S260 is YES, there are executed the individual controls, as described at Step S261. These controls are= to abruptly release and subsequent inhibit application of the lockup clutch 12D; to limit the output of the engine 1; to raise the belt clamping force; and to inhibit the upshift and downshift.

By executing these controls, it is possible to prevent in advance the belt from slipping due to the impact at the time when the drive wheels restore the gripping and accordingly from damaging the belt 8 and the pulleys 22 and 23. Whether or not the drive wheels have slipped to the acceleration side can be decided with a phenomenon that the changing rate of the output speed of the CVT 2 exhibits an extraordinarily large value. However, it is difficult to detect the slip accurately in a low rotation state where the pulses outputted from the rotation sensor have a long interval. Moreover, this method cannot detect whether or not a normal restoration is made from the acceleration-slipping state. It is, therefore, desirable to decide the acceleration slip of the drive wheels by the anti-lock brake electronic control device (ABS-ECU) capable of detecting the speeds of the four wheels containing those other than the drive wheels individually, and to receive this state by communications. The communication line can be used in the control device thus far described in this specific example, because the communication line is interposed in advance between the control device and the ABS-ECU for communications of the active state of the anti-lock brake control device 100. According to the method of the run pulses, for example, the acceleration-slip state can be communicated without increasing the communication line. The state of the acceleration slip in the ABS-ECU may be decided according to the known technique by comparing the drive wheel speed and the driven wheel speed.

Here, the aforementioned technique "to execute the control of the CVT 2 at the anti-lock brake control time on the basis of the rounded information" is also enabled to effectively function in the system in which the failure in the anti-lock brake control is not especially judged.

Moreover, the specific examples thus far described are constructed to select the release of only the lockup clutch in dependence upon the decision on whether or not the braking is abrupt or the execution of all necessary countermeasures. In this embodiment, however, the conditions may be more finely set to increase the controls (or countermeasures) to be executed according to the conditions. Moreover, the aforementioned specific examples have been described on the example in which the anti-lock brake control device (ABS) is adopted as the wheel control means. However, the wheel control means in this invention may be a traction control for suppressing the slip of the wheels by limiting the torque transmitted from the prime mover.

According to this invention, as has been described hereinbefore, the vehicle can be reliably prevented from reaching the engine stall, even when the wheel control such as the anti-lock brake control or the traction control is disabled to perform the normal function by any reason and even when the vehicle is braked in this state.

In this invention, moreover, when the braking is effected with the control of the wheels being troubled, the contents of the control on the continuously variable transmission built in the drive line can be changed to execute the control which is fitted for the higher torque input from the output side, so that the damage of the continuously variable transmission and the drop in its durability can be prevented in advance.

INDUSTRIAL APPLICABILITY

This invention can be employed in a vehicle which uses an internal combustion engine as a prime mover and which is provided with means for controlling the rotation of drive wheels, to which a torque is transmitted from the prime mover, by a braking mechanism, so that it can be utilized in not only the industry relating to the manufacture of a vehicle but also the industry relating the running maintenance of the vehicle.

What is claimed is:

1. A control device for a drive line of a vehicle, in which the drive line from a power source to drive wheels includes wheel control means for controlling a speed of said wheels, and a connection mechanism for increasing/decreasing a torque transmission capacity between said power source and the drive wheels, comprising:

trouble detecting means for detecting that said wheel control means is in a situation unable to control the speed of said wheels normally due to a failure of the wheel control means;

braking detecting means for detecting that a braking operation to brake a rotation of said wheels is executed; and torque interruption control means for reducing the torque transmission capacity by said connection mechanism, when it is detected by said trouble detecting means that said wheel control means can not control the speed of said wheels normally due to the failure and when it is detected by said braking detecting means that the braking operation to brake the rotation of said wheels is executed.

2. The control device for the drive line of the vehicle as set forth in claim 1, wherein said power source includes an internal combustion engine configured to be selectively interrupted in its fuel feed at a deceleration time, and further comprising:

condition satisfaction deciding means for deciding satisfaction of a predetermined condition; and fuel feed returning means for executing fuel feed by releasing an interruption of the fuel feed to said internal combustion engine, when it is detected by said trouble detecting means that said wheel control means cannot control the speed of said wheels normally due to the failure, when it is detected by said braking detecting means that the braking operation to brake the rotation of said wheels is executed, and when the satisfaction of said predetermined condition is decided by said condition satisfaction deciding means.

3. The control device for the drive line of the vehicle as set forth in claim 2, wherein said condition includes at least one of that the braking operation is an abrupt braking, that a vehicle speed is at a predetermined reference value or lower, and that a slip ratio of the drive wheels is at a predetermined value or higher.

4. The control device for the drive line of the vehicle as set forth in claim 1 further comprising:

abrupt braking deciding means for deciding whether or not the braking operation is an abrupt braking with large braking force, after the torque transmission capacity of the connection mechanism was decreased by the torque interruption control means; and abrupt braking control means for executing at least one of controls that the control accompanying the abrupt braking of the power source and the control accompanying the abrupt braking of the transmission constructing the drive line.

5. The control device for the drive line of the vehicle as set forth in claim 1, further comprising:

abrupt braking deciding means for deciding whether or not the braking operation is an abrupt braking with large braking force, after the torque transmission capacity of the connection mechanism was decreased by the torque interruption control means; and means for executing one of controls that the control for executing the fuel feed by releasing the interruption of the fuel feed when the internal combustion engine as a power source configured to be selectively interrupted in its fuel feed at a deceleration time, the control for limiting a shifting rate when the transmission can change the shifting rate, or the control for increasing a clamping force in a continuously variable transmission when the transmission is a continuously variable transmission.

6. A control device for a drive line of a vehicle in which the drive line from internal combustion engine, which is configured to be selectively interrupted in its fuel feed at a deceleration time, to drive wheels includes wheel control means for controlling a speed of said wheels, and a connection mechanism for increasing/decreasing a torque transmission capacity between said power source and the drive wheels, comprising:

trouble detecting means for detecting that said wheel control means is in a situation unable to control the speed of said wheels normally due to a failure of the wheel control means;

braking detecting means for detecting that a braking operation to brake a rotation of said wheels is executed;

torque interruption control means for reducing the torque transmission capacity by said connection mechanism, when it is detected by said trouble detecting means that said wheel control means cannot control the speed of said wheels normally due to the failure and when it is detected by said braking detecting means that the braking operation to brake the rotation of said wheels is executed;

condition satisfaction deciding means for deciding the satisfaction of the condition if a time period for a speed of said internal combustion engine to reach a minimum value for enabling an autonomous rotation of the internal combustion engine is shortened by said braking; and fuel feed returning means for executing fuel feed by releasing an interruption of the fuel feed to said internal combustion engine, when it is detected by said trouble detecting means that said wheel control means cannot control the speed of said wheels normally due to the failure, when it is detected by said braking means that the braking operation to brake the rotation of said wheels is executed and when the satisfaction of said predetermined condition is decided by said condition satisfaction deciding means.

7. A control device for a drive line of a vehicle, in which the drive line from a power source to drive wheels includes wheel control means for controlling a speed of said wheels, and a continuously variable transmission with a lockup clutch, comprising:

trouble detecting means for detecting that said wheel control means is in a situation unable to control the speed of said wheels normally due to a failure of the wheel control means;

braking detecting means for detecting that a braking operation to brake the rotation of said wheels is executed; and release control means for controlling said lockup clutch to a release side to lower a torque transmission capacity of said lockup clutch, when it is detected by said trouble detecting means that said wheel control means cannot control the speed of said wheels normally due to the failure and when it is detected by said braking detecting means that the braking operation to brake the rotation of said wheels is executed.

8. The control device for the drive line of the vehicle as set forth in claim 7, further comprising:

condition satisfaction deciding means for deciding satisfaction of a predetermined condition; and continuously variable transmission control changing means for changing control contents of said continuously variable transmission, when it is detected by said trouble detecting means that said wheel control means cannot control the speed of said wheels normally due to the failure, when it is detected by said braking detecting means that the braking operation to brake the rotation of said wheels is executed, and when the satisfaction of said predetermined condition is decided by said condition satisfaction deciding means.

9. The control device for the drive line of the vehicle as set forth in claim 8, wherein said condition includes at least one of those that the braking operation is an abrupt braking, that the vehicle speed is at a predetermined reference value or lower, and that a slip ratio of the drive wheels is at a predetermined value or higher.

10. The control device for the drive line of the vehicle as set forth in claim 8, wherein said continuously variable transmission control changing means includes means for increasing power transmission capacity in said continuously variable transmission.

11. The control device for the drive line of the vehicle as set forth in claim 8, wherein said continuously variable transmission control changing means includes means for limiting a shift in said continuously variable transmission to a predetermined state.

12. The control device for the drive line of the vehicle as set forth in claim 8, wherein said condition satisfaction deciding means includes means for deciding the satisfaction/dissatisfaction of a plurality of conditions contained in said condition, individually, and further comprising:

a communication line for transmitting states of satisfaction/dissatisfaction of the plurality of conditions.

13. The control device for the drive line of the vehicle as set forth in claim 8, further comprising:

rounding means for rounding input parameters for controlling said continuous transmission means; and shift control means for controlling a shift of said continuously variable transmission based on the input parameters rounded by said rounding means, when it is not detected by said trouble detecting means that said wheel control means cannot control the speed of said wheels normally and when said wheel control means controls the rotation of said wheels.

14. A control device for the drive line of a vehicle in which the drive line from a power source to drive wheels includes wheel control means for controlling a speed of said wheels, and a continuously variable transmission with a lockup clutch, comprising:

trouble detecting means for detecting that said wheel control means is in a situation unable to control the speed of said wheels normally due to a failure of the wheel control means;

braking detecting means for detecting that a braking operation to brake the rotation of said wheels is executed;

release control means for controlling said lockup clutch to a release side to lower a torque transmission capacity of said lockup clutch, when it is detected by said trouble detecting means that said wheel control means cannot control the speed of said wheels normally due to the failure and when it is detected by said braking detecting means that the braking operation to brake the rotation of said wheels is executed;

condition satisfaction deciding means for deciding the satisfaction of the condition if a time period for a speed of said internal combustion engine to reach a minimum value for enabling an autonomous rotation of the internal combustion engine is shortened by said braking; and continuously variable transmission control changing means for changing control contents of said continuously variable transmission, when it is detected by said trouble detecting means that said wheel control means cannot control the speed of said wheels normally due to the failure, when it is detected by said braking detecting means that the braking operation to brake the rotation of said wheels is executed, and when the satisfaction of said predetermined condition is decided by said condition satisfaction deciding means.

15. A control device for a drive line of a vehicle, in which the drive line from a power source to drive wheels includes wheel control means for controlling a speed of said wheels, and a connection mechanism for increasing/decreasing a torque transmission capacity between said power source and the drive wheels, comprising:

trouble detecting means for detecting that said wheel control means is in a situation unable to control the speed of said wheels normally;

braking detecting means for detecting that a braking operation to brake a rotation of said wheels is executed;

torque interruption control means for reducing the torque transmission capacity by said connection mechanism, when it is detected by said trouble detecting means that said wheel control means cannot control the speed of said wheels normally and when it is detected by said braking detecting means that the braking operation to brake the rotation of said wheels is executed; and output raising means for raising an output of said power source, when it is detected by said trouble detecting means that said wheel control means cannot control the speed of said wheels normally and when it is detected by said braking detecting means that the braking operation to brake the rotation of said wheels is executed.

16. The control device for the drive line of the vehicle as set forth in claim 15, further comprising:

condition satisfaction deciding means for deciding satisfaction of a predetermined condition, wherein said power source includes an internal combustion engine configured to be selectively interrupted in its fuel feed at a deceleration time, and wherein said output raising means includes fuel feed returning means for executing fuel feed to said internal combustion engine by releasing an interruption of the fuel feed, when said condition satisfaction deciding means decides the satisfaction of said predetermined condition.

17. The control device for the drive line of the vehicle as set forth in claim 16, wherein said condition satisfaction deciding means includes means for deciding the satisfaction of the condition if a time period for a speed of said internal combustion engine to reach a minimum value for enabling an autonomous rotation of the internal combustion engine is shortened by said braking.

18. The control device for the drive line of the vehicle as set forth in claim 16, wherein said condition includes at least one of those that the braking operation is an abrupt braking, that the vehicle speed is at a predetermined reference value or lower, and that a slip ratio of the drive wheels is at a predetermined value or higher.

19. A control device for a drive line of a vehicle, in which the drive line from a power source to drive wheels includes wheel control means for controlling a speed of said wheels, and a continuously variable transmission with a lockup clutch, comprising:

trouble detecting means for detecting that said wheel control means is in a situation unable to control the speed of said wheels normally due to a failure of the wheel control means;

braking detecting means for detecting that a braking operation to brake a rotation of said wheels is executed;

release control means for controlling said lockup clutch to a release side to lower a torque transmission capacity of said lockup clutch, when it is detected by said trouble detecting means that said wheel control means cannot control the speed of said wheels normally due to the failure and when it is detected by said braking detecting means that the braking operation to brake the rotation of said wheels is executed; and continuously variable transmission control changing means for changing control contents of said continuously variable transmission, when it is detected by said trouble detecting means that said wheel control means cannot control the speed of said wheels normally due to the failure and when it is detected by said braking detecting means that the braking operation to brake the rotation of said wheels is executed.

20. The control device for the drive line of the vehicle as set forth in claim 19, further comprising:

condition satisfaction deciding means for deciding satisfaction of a predetermined condition, wherein said continuously variable transmission control changing means includes means for changing control contents of said continuously variable transmission when said condition satisfaction deciding means decides the satisfaction of said predetermined condition.

21. The control device for the drive line of the vehicle as set forth in claim 20, wherein said condition includes at least one of those that the braking operation is an abrupt braking, that the vehicle speed is at a predetermined reference value or lower, and that a slip ratio of the drive wheels is at a predetermined value or higher.

22. The control device for the drive line of the vehicle as set forth in claim 19, wherein said continuously variable transmission control changing means includes means for increasing power transmission capacity in said continuously variable transmission.

23. The control device for the drive line of the vehicle as set forth in claim 19, wherein said continuously variable transmission control changing means includes means for limiting a shift in said continuously variable transmission to a predetermined state.

24. A control device for a drive line of a vehicle in which the drive line from a power source to drive wheels includes wheel control means for controlling a speed of said wheels, and a continuously variable transmission with a lockup clutch, comprising:

trouble detecting means for detecting that said wheel control means is in a situation unable to control the speed of said wheels normally due to a failure of the wheel control means;

braking detecting means for detecting that a braking operation to brake the rotation of said wheels is executed;

release control means for controlling said lockup clutch to a release side to lower a torque transmission capacity of said lockup clutch when it is detected by said trouble detecting means that said wheel control means cannot control the speed of said wheels normally due to the failure and when it is detected by said braking detecting means that the braking operation to brake the rotation of said wheels is executed; and continuously variable transmission control changing means for changing control contents of said continuously variable transmission, when it is detected by said trouble detecting means that said wheel control means cannot control the speed of said wheels normally due to the failure and when it is detected by said raking detecting means that the braking operation to brake the rotation of said wheels is executed; and condition satisfaction deciding means for deciding the satisfaction of the condition if a time period for a speed of said internal combustion engine to reach a minimum value for enabling an autonomous rotation of the internal combustion engine is shortened by said braking.

25. A control device for a drive line of a vehicle, in which the drive line from a power source to drive wheels includes wheel controller for controlling a speed of said wheels, and a connection mechanism for increasing/decreasing a torque transmission capacity between said power source and the drive wheels, comprising:

a trouble detector for detecting that said wheel controller is in a situation unable to control the speed of said wheels normally due to a failure of the wheel controller;

a braking detector for detecting that a braking operation to brake a rotation of said wheels is executed; and a torque interruption controller for reducing the torque transmission capacity by said connection mechanism, when it is detected by said trouble detector that said wheel controller cannot control the speed of said wheels normally due to the failure and when it is detected by said braking detector that the braking operation to brake the rotation of said wheels is executed.

26. A control device for a drive line of a vehicle, in which the drive line from a power source to drive wheels includes a wheel controller for controlling a speed of said wheels, and a continuously variable transmission with a lockup clutch, comprising:

a trouble detector for detecting that said wheel controller is in a situation unable to control the speed of said wheels normally due to a failure of the wheel controller;

a braking detector for detecting that a braking operation to brake the rotation of said wheels is executed; and a release controller for controlling said lockup clutch to a release side to lower a torque transmission capacity of said lockup clutch, when it is detected by said trouble detector that said wheel controller cannot control the speed of said wheels normally due to the failure and when it is detected by said braking detector that the braking operation to brake the rotation of said wheels is executed.

27. A control device for a drive line of a vehicle, in which the drive line from a power source to drive wheels includes wheel controller for controlling a speed of said wheels, and a connection mechanism for increasing/decreasing a torque transmission capacity between said power source and the drive wheels, comprising:

a trouble detector for detecting that said wheel controller is in a situation unable to control the speed of said wheels normally;

a braking detector for detecting that a braking operation to brake a rotation of said wheels is executed;

a torque interruption controller for reducing the torque transmission capacity by said connection mechanism, when it is detected by said trouble detector that said wheel controller cannot control the speed of said wheels normally and when it is detected by said braking detector that the braking operation to brake the rotation of said wheels is executed; and an output raiser for raising an output or said power source, when it is detected by said trouble detector that said wheel controller cannot control the speed of said wheels normally and when it is detected by said braking detector that the braking operation to brake the rotation of said wheels is executed.

28. A control device for a drive line of a vehicle, in which the drive line from a power source to drive wheels includes a wheel controller for controlling a speed of said wheels, and a continuously variable transmission with a lockup clutch, comprising:

a trouble detector for detecting that said wheel controller is in a situation unable to control the speed of said wheels normally due to a failure of the wheel controller;

a braking detector for detecting that a braking operation to brake a rotation of said wheels is executed;

a release controller for controlling said lockup clutch to a release side to lower a torque transmission capacity of said lockup clutch, when it is detected by said trouble detector that said wheel controller cannot control the speed of said wheels normally due to the failure and when it is detected by said braking detector that the braking operation to brake the rotation of said wheels is executed; and a continuously variable transmission control changer for changing control contents of said continuously variable transmission, when it is detected by said trouble detector that said wheel controller cannot control the speed of said wheels normally due to the failure and when it is detected by said braking detector that the braking operation to brake the rotation of said wheels is executed.

29. A controlling method for a drive line of a vehicle, in which the drive line from a power source to drive wheels includes wheel controller for controlling a speed of said wheels, and a connection mechanism for increasing/decreasing a torque transmission capacity between said power source and the drive wheels, comprising:
- a trouble detecting step for detecting an unable situation to control the speed of said wheels normally due to a failure of the wheel controller;
- a braking detecting step for detecting that a braking operation to brake a rotation of said wheels is executed; and
- a torque interruption controlling step for reducing the torque transmission capacity by said connection mechanism, when it is detected that said wheel controller cannot control the speed of said wheels normally due to the failure and when it is detected that the braking operation to brake the rotation of said wheels is executed.

30. A controlling method for a drive line of a vehicle, in which the drive line from a power source to drive wheels includes wheel controller for controlling a speed of said wheels, and a continuously variable transmission with a lockup clutch, comprising:
- a trouble detecting step for detecting an unable situation to control the speed of said wheels normally due to a failure of the wheel controller;
- a braking detecting step for detecting that a braking operation to brake the rotation of said wheels is executed; and
- a release controlling step for controlling said lockup clutch to a release side to lower a torque transmission capacity of said lockup clutch, when it is detected that said wheel controller cannot control the speed of said wheels normally due to the failure and when it is detected that the braking operation to brake the rotation of said wheels is executed.

31. A controlling method for a drive line of a vehicle, in which the drive line from a power source to drive wheels includes a wheel controller for controlling a speed of said wheels, and a connection mechanism for increasing/decreasing a torque transmission capacity between said power source and the drive wheels, comprising:
- a trouble detecting step for detecting an unable situation to control the speed of said wheels normally due to a failure of the wheel controller;
- a braking detecting step for detecting that a braking operation to brake a rotation of said wheels is executed;
- a torque interruption controlling step for reducing the torque transmission capacity by said connection mechanism, when it is detected that said wheel controller cannot control the speed of said wheels normally and when it is detected that the braking operation to brake the rotation of said wheels is executed; and
- an output raising step for raising an output of said power source, when it is detected that said wheel controller cannot control the speed of said wheels normally and when it is detected that the braking operation to brake the rotation of said wheels is executed.

32. A controlling method for a drive line of a vehicle, in which the drive line from a power source to drive wheels includes a wheel controller for controlling a speed of said wheels, and a continuously variable transmission with a lockup clutch, comprising:
- a trouble detecting step for detecting an unable situation to control the speed of said wheels normally due to a failure of the wheel controller;
- a braking detecting step for detecting that a braking operation to brake a rotation of said wheels is executed;
- a release controlling step for controlling said lockup clutch to a release side to lower a torque transmission capacity of said lockup clutch, when it is detected that said wheel controller cannot control the speed of said wheels normally due to the failure and when it is detected that the braking operation to brake the rotation of said wheels is executed; and
- a continuously variable transmission control changing step for changing control contents of said continuously variable transmission, when it is detected that said wheel controller cannot control the speed of said wheels normally due to the failure and when it is detected that the braking operation to brake the rotation of said wheels is executed.

* * * * *